United States Patent
Memory

(10) Patent No.: US 7,752,984 B2
(45) Date of Patent: Jul. 13, 2010

(54) DEVICE AND METHOD FOR DENSE PHASE TRANSPORT OF SEED

(75) Inventor: Russell James Memory, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/271,723

(22) Filed: Nov. 14, 2008

(65) Prior Publication Data

US 2010/0122645 A1    May 20, 2010

(51) Int. Cl.
A01C 7/00    (2006.01)
A01C 9/00    (2006.01)
(52) U.S. Cl. ..................... 111/176; 111/174
(58) Field of Classification Search ........... 111/176, 111/174, 170
See application file for complete search history.

(56) References Cited

U.S. PATENT DOCUMENTS

| | | | |
|---|---|---|---|
| 524,474 A | 8/1894 | Wade |
| 670,534 A | 3/1901 | Carmical |
| 1,369,649 A | 2/1921 | Gieseler |
| 2,062,295 A | 12/1936 | Cary et al. |
| 2,171,205 A | 8/1939 | Zinke |
| 2,193,738 A | 3/1940 | Perrin |
| 2,559,183 A | 7/1951 | Barnett |
| 2,671,690 A | 3/1954 | Von Ehrenkrook |
| 2,814,531 A | 11/1957 | Murray, Jr. |
| 2,937,049 A | 5/1960 | Osawa |
| 3,197,261 A | 7/1965 | Kauffman |
| 3,207,560 A | 9/1965 | Brown |
| 3,376,897 A | 4/1968 | Dolder et al. |
| 3,386,474 A | 6/1968 | Kimmel |
| 3,387,895 A | 6/1968 | Hochmuth et al. |
| 3,515,315 A | 6/1970 | Kidd |
| 3,543,704 A | 12/1970 | Hansen |
| 3,548,765 A | 12/1970 | Grataloup |
| 4,036,408 A | 7/1977 | Dugge |
| 4,082,364 A | 4/1978 | Krambrock |
| 4,200,412 A | 4/1980 | Steele |
| 4,244,522 A | 1/1981 | Hartwig |
| 4,264,243 A | 4/1981 | Bentzen-Bilkvist |
| 4,280,419 A | 7/1981 | Fischer |
| 4,379,664 A | 4/1983 | Klein et al. |
| 4,413,935 A | 11/1983 | Smith et al. |
| 4,473,016 A * | 9/1984 | Gust ..................... 111/174 |
| 4,506,704 A | 3/1985 | Boom et al. |
| 4,553,882 A | 11/1985 | Knappertz |
| 4,562,779 A | 1/1986 | Briggs |

(Continued)

FOREIGN PATENT DOCUMENTS

BR    9501580-9 A    11/1995

(Continued)

Primary Examiner—Christopher J. Novosad
(74) Attorney, Agent, or Firm—Rebecca Henkel

(57) ABSTRACT

The present invention provides a device and a method for dense phase transport of a granular product, such as seed. A dense phase delivery line includes a porous medium located along a side wall of the dense phase delivery line. When air and seed are send through the delivery line, a control cover may be moveably positionable over the porous medium to control the flow of air through the porous medium and to start, stop, or otherwise control the dense phase transport of seed through the dense phase delivery line.

**17 Claims,

U.S. PATENT DOCUMENTS

| | | | |
|---|---|---|---|
| 4,674,922 A | 6/1987 | Federhen et al. | |
| 4,738,770 A | 4/1988 | Hastings et al. | |
| 4,779,765 A | 10/1988 | Neumeyer | |
| 4,793,743 A | 12/1988 | Grodecki et al. | |
| 4,843,983 A | 7/1989 | Olson | |
| 4,872,785 A | 10/1989 | Schrage et al. | |
| 5,033,914 A | 7/1991 | Wuertele et al. | |
| 5,069,583 A | 12/1991 | Caldwell | |
| 5,156,102 A | 10/1992 | Andersen | |
| 5,161,473 A | 11/1992 | Landphair et al. | |
| 5,240,355 A | 8/1993 | Hudalla | |
| 5,379,706 A | 1/1995 | Gage et al. | |
| 5,392,722 A | 2/1995 | Snipes et al. | |
| 5,407,305 A | 4/1995 | Wallace | |
| 5,494,381 A | 2/1996 | Heyl et al. | |
| 5,575,225 A | 11/1996 | Smith et al. | |
| 5,749,682 A | 5/1998 | Epting | |
| 5,813,801 A | 9/1998 | Newbolt et al. | |
| 5,878,679 A | 3/1999 | Gregor et al. | |
| 5,915,312 A * | 6/1999 | Meyer et al. | 111/174 |
| 5,927,217 A | 7/1999 | Halford et al. | |
| 6,047,652 A | 4/2000 | Prairie et al. | |
| 6,253,693 B1 | 7/2001 | Mayerle et al. | |
| 6,289,830 B2 * | 9/2001 | Mayerle et al. | 111/174 |
| 6,298,797 B1 | 10/2001 | Mayerle et al. | |
| 6,308,645 B1 | 10/2001 | Newkirk et al. | |
| 6,308,646 B1 | 10/2001 | Luxon | |
| 6,311,727 B1 | 11/2001 | Campau | |
| 6,343,896 B1 | 2/2002 | Goodier et al. | |
| 6,499,413 B2 | 12/2002 | Kleinknecht et al. | |
| 6,505,569 B1 | 1/2003 | Richard | |
| 6,581,532 B1 | 6/2003 | Hagen et al. | |
| 6,584,919 B2 | 7/2003 | McQuinn | |
| 6,644,225 B2 | 11/2003 | Keaton | |
| 6,648,558 B1 | 11/2003 | Shultz | |
| 6,742,464 B1 | 6/2004 | Chiu | |
| 6,782,835 B2 | 8/2004 | Lee et al. | |
| 6,854,405 B2 | 2/2005 | Memory | |
| 6,899,042 B1 | 5/2005 | Kowalchuk | |
| 6,904,851 B2 | 6/2005 | Memory | |
| 6,928,938 B2 | 8/2005 | Memory | |
| 6,928,939 B1 | 8/2005 | Johnson et al. | |
| 6,935,254 B2 | 8/2005 | Ostrander et al. | |
| 7,017,502 B2 | 3/2006 | Quam et al. | |
| 7,040,242 B2 | 5/2006 | Memory | |
| 7,048,475 B2 | 5/2006 | Cloue et al. | |
| 7,101,120 B2 | 9/2006 | Jurkovich | |
| 7,213,525 B2 | 5/2007 | Meyer et al. | |
| 7,267,061 B2 | 9/2007 | Mayerle | |
| 7,270,064 B2 | 9/2007 | Kjelsson et al. | |
| 2003/0005867 A1 * | 1/2003 | Richard | 111/174 |
| 2006/0243179 A1 | 11/2006 | Landphair et al. | |
| 2007/0022928 A1 | 2/2007 | Kowalchuk | |
| 2007/0181048 A1 | 8/2007 | Pleyer | |

FOREIGN PATENT DOCUMENTS

| | | |
|---|---|---|
| DE | 3528301 A1 | 2/1987 |
| DE | 19620016 A1 | 11/1997 |
| DE | 10006811 A1 | 1/2001 |
| EP | 0331302 A1 | 6/1989 |
| GB | 2064021 A | 6/1981 |
| GB | 2096085 A | 10/1982 |
| GB | 2222131 A | 2/1990 |
| JP | 61111227 A | 5/1986 |
| JP | 01013311 A | 1/1989 |
| JP | 06092454 A | 4/1994 |
| JP | 2003070329 A | 3/2003 |
| JP | 2003081425 A | 3/2003 |

* cited by examiner

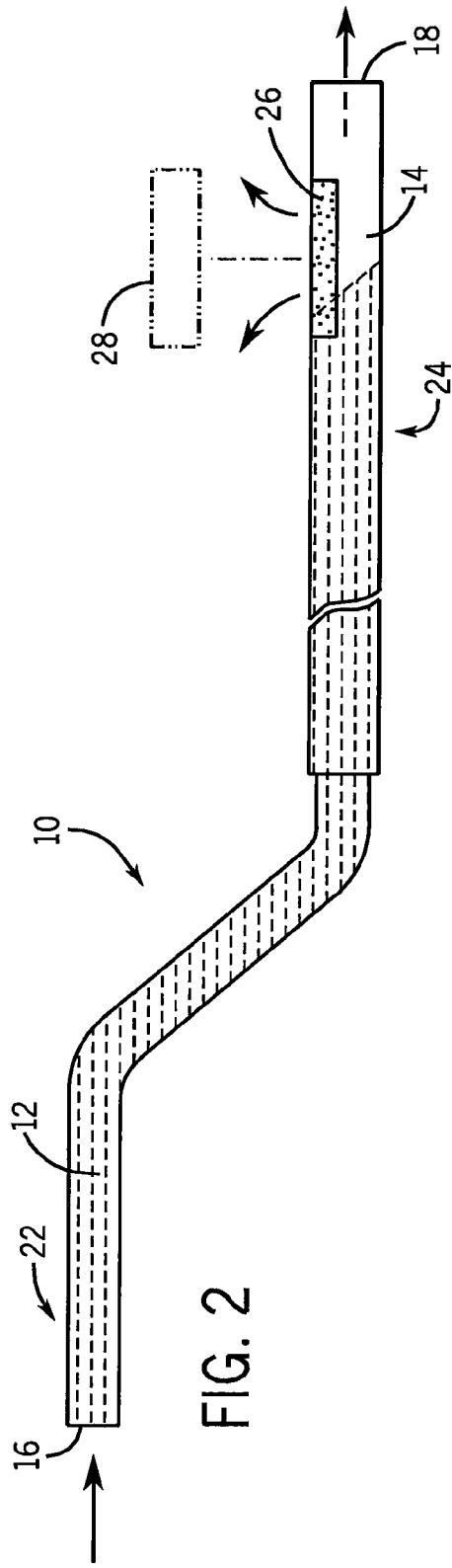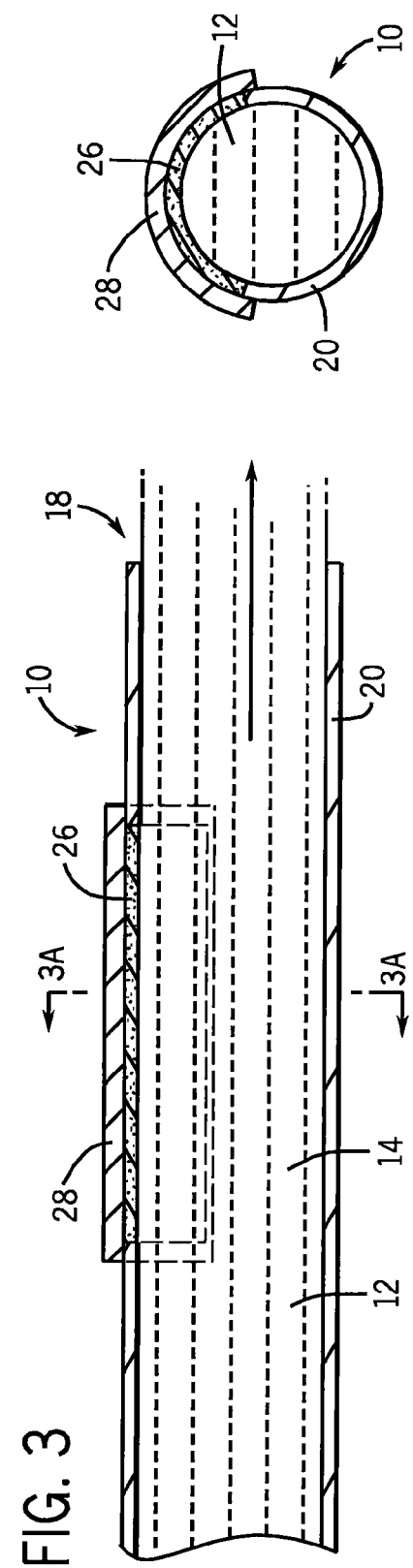

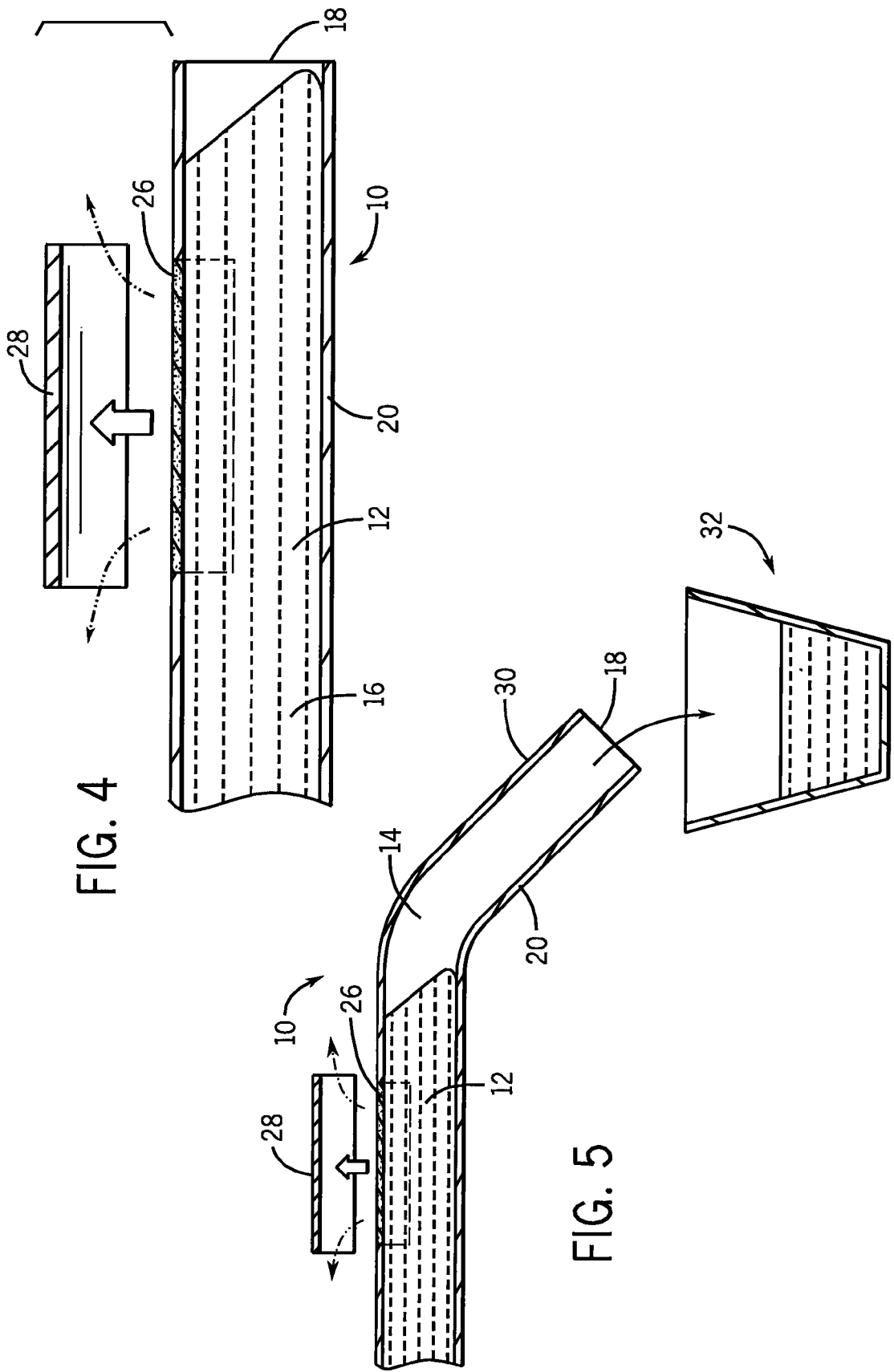

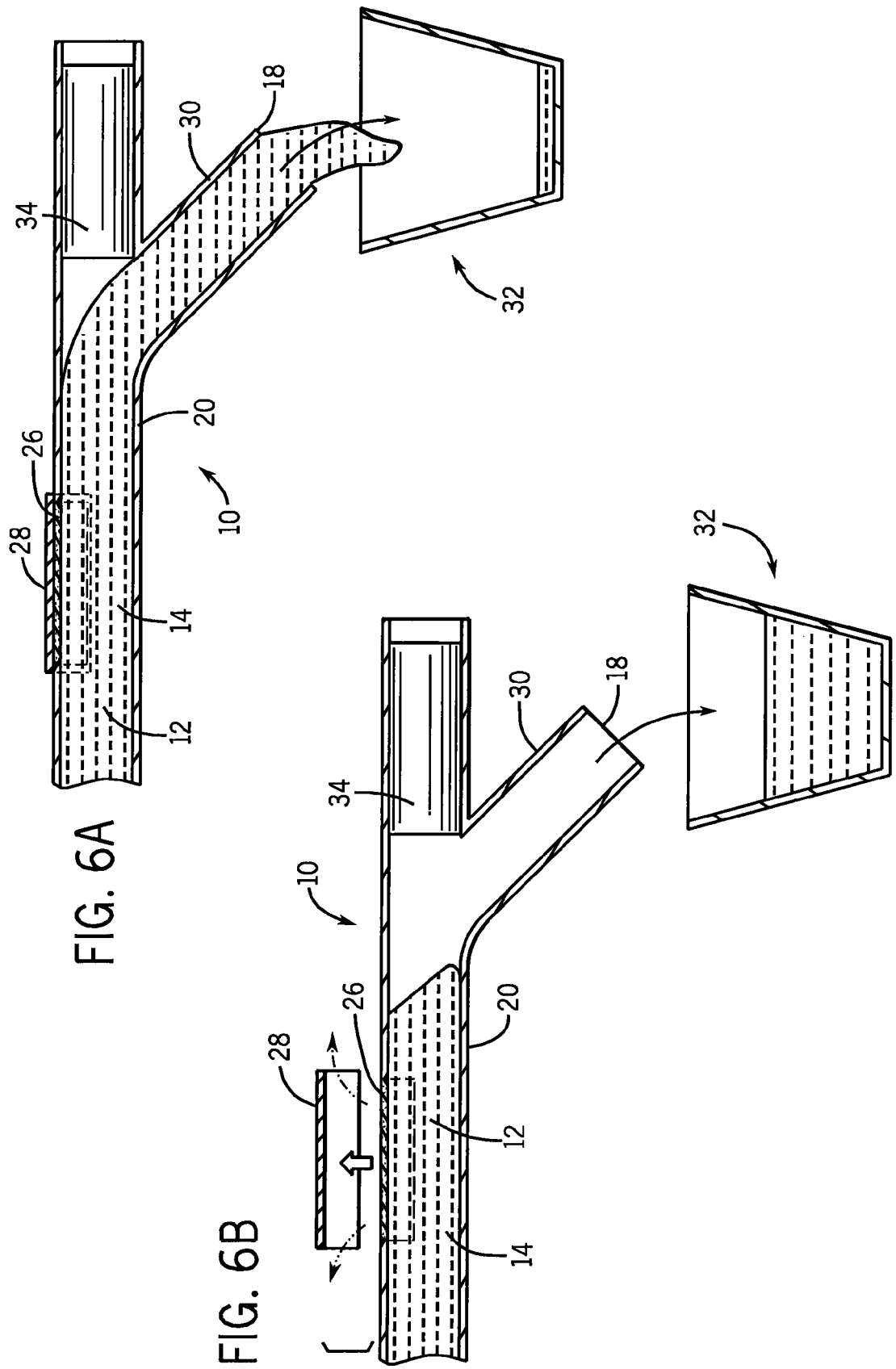

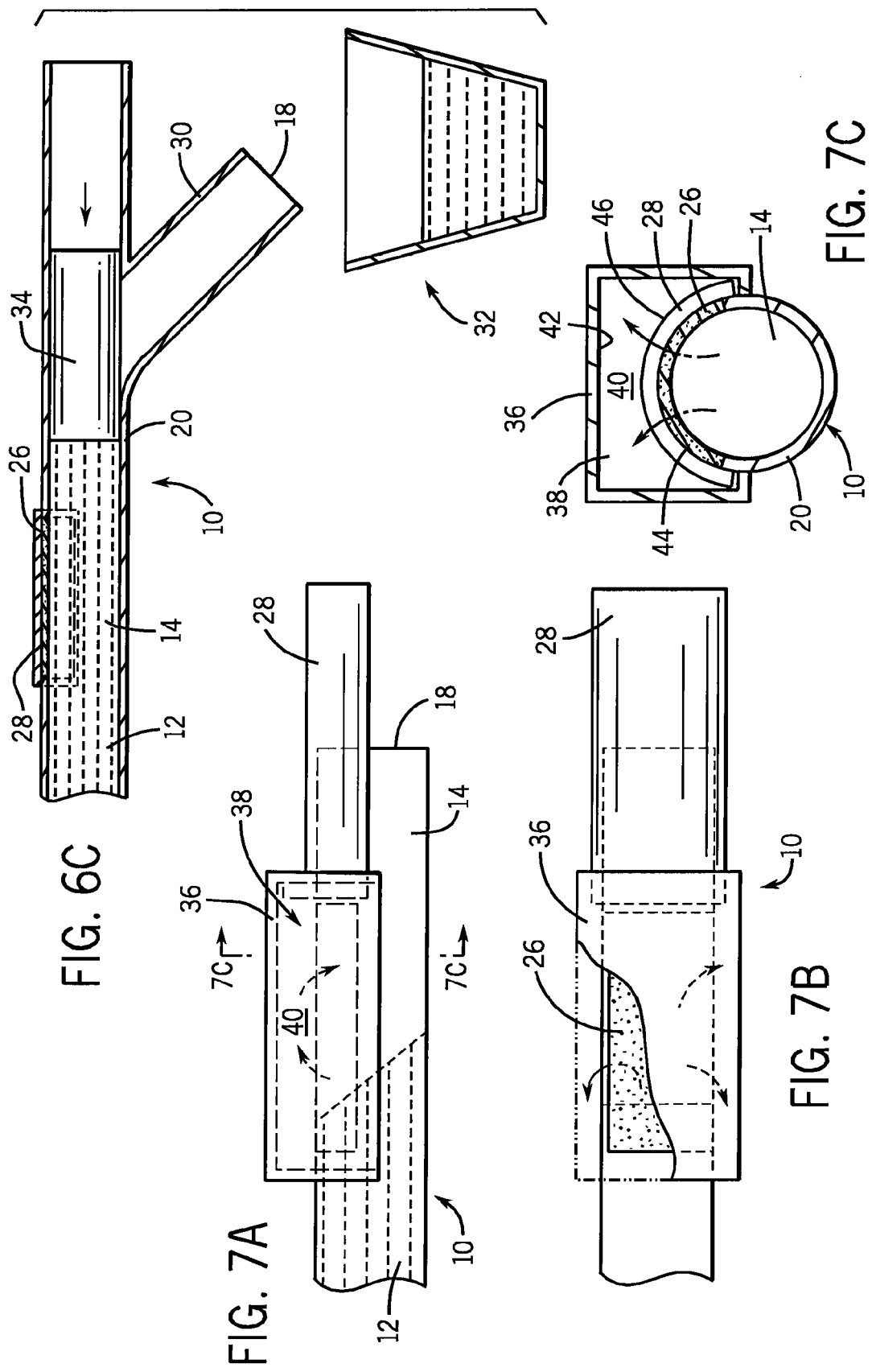

DEVICE AND METHOD FOR DENSE PHASE TRANSPORT OF SEED

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

This invention relates to agricultural implements. In particular, this invention relates to the transport of a granular product, such as seed.

In many agricultural implements, a dry granular product, such as seed, fertilizer and the like, must be transported from a central containment unit to a number of secondary containment units. Commonly, pneumatic units are used to drive the seed through delivery lines from the central containment unit to the secondary containment units. These secondary containment units may be spread out over a large area to provide a large coverage area.

Transport of the seed from the central containment unit to the secondary containment units may occur as dilute phase transport or dense phase transport. In dilute phase transport, there is a large amount of air relative to the product being transported. In dense phase transport, there is a greater ratio of product to air volume in the delivery line.

Although dense phase transport is desirable for moving larger quantities of product, control of the flow of the product is difficult, particularly with respect to starting and stopping product flow. As dense phase transport requires substantially filling the delivery line with the granular product being transported, the operation of valves within the delivery line can be problematic. The operation of a valve may displace the seed being transported and/or may crush and damage the seed. Moreover, closed valves will result in the buildup of pressure in the delivery lines that will cause a sudden surge when the valve is opened. Although the flow of air could be turned on or off to start or stop the transport, this may add extra cost in the form of variable speed pneumatic units or the like. Moreover, the when there are a plurality of delivery lines, stopping the flow to one of the lines or a segment of the line may require complex pneumatic arrangements or multiple air sources.

Hence, a need exists for an improved system and method to control the dense phase transport of a granular product, such as seed, through a delivery line. In particular, there is a need to control the dense phase transport of seed without an inline valve that could damage the product or require complex control systems.

SUMMARY OF THE INVENTION

The present invention provides a device for controlling a dense phase transport of a granular product through a dense phase delivery line. The dense phase delivery line includes at least one side wall defining a passageway that extends from an intake end for receiving pressurized air and the granular product to a discharge outlet. The device includes a porous medium and a control cover. The porous medium is located along a portion of at least one side wall of the dense phase delivery line upstream of the discharge outlet. The porous medium provides a fluid pathway between an inner volume of the passageway of the dense phase delivery line and a volume outside of the dense phase delivery line. The control cover is moveably positionable proximate the porous medium for selectively controlling a flow of the pressurized air from the inner volume of the passageway through the porous medium. When pressurized air and the granular product are provided on the intake end of the dense phase delivery line, the control cover can be moved from a first position to a second position. The first position permits the dense phase transport of the granular product through the dense phase delivery line and out the discharge outlet. The second position inhibits the dense phase transport of the granular product through the dense phase delivery line without stopping an upstream flow of the pressurized air.

In one form of the invention, when the control cover is in the first position that permits a dense phase transport of the granular product through the dense phase delivery line and out the discharge outlet, the control cover may entirely cover an outer surface of the porous medium to essentially stop the flow of the pressurized air from the passageway through the porous medium.

In another form of the invention, when the control cover is in the first position that permits a dense phase transport of the granular product through the dense phase delivery line and out the discharge outlet, the control cover may cover only a portion of the porous medium to allow a portion of the pressurized air in the passageway through the porous medium while still transporting the granular product.

In other forms of the invention, when the control cover is in the second position that inhibits the dense phase transport of the granular product through the dense phase delivery line, the control cover may be entirely removed from an outer surface of the porous medium to allow a portion of the pressurized air in the passageway through the porous medium.

In other forms of the invention, when the control cover is in the second position that inhibits the dense phase transport of the granular product through the dense phase delivery line, the control cover may cover only a portion of the porous medium to allow a portion of the pressurized air in the passageway through the porous medium.

According to another aspect of the invention, the porous medium may have a pore size less than the granular product being transported by the dense phase delivery line during dense phase flow. The small pore size may permit a portion of the pressurized air through the porous medium while preventing the passage of the granular product through the porous medium.

According to yet another aspect of the invention, the device may further include a controller that moves the control cover between one of the first position and the second position to the other of the first position and the second position.

According to still another aspect of the invention, the device may also include an air and product valve along the dense phase delivery line downstream of the porous medium that selectively blocks the dense phase delivery line upstream of the discharge outlet.

In this form, the dense phase delivery line may further include a down leg downstream of the porous medium and before the air and product valve, such that a portion of the granular product may travel down the down leg to the discharge outlet before the air and product valve is closed to clear the air and product valve of the granular product.

According to yet another aspect of the invention, the device further includes a containment cap rigidly connected to an outer surface of at least one of the side walls of the dense phase delivery line proximal the porous medium. A space between the containment cap and the porous medium is present for slideably receiving the control cover.

According to one aspect of the invention, the containment cap may be welded to the outer surface of the at least one side wall of the dense phase delivery line.

According to one aspect of the invention, an inner surface of the containment cap, an outer surface of the porous medium, and an edge of the control cover may define an adjustable volume between the containment cap, the porous medium, and the control cover.

According to one aspect of the invention, the control cover may be slideably moveable within the space between the control cover and the porous medium to change the adjustable volume and control the dense phase flow of the granular product.

According to still yet another aspect of the invention, the discharge outlet of the dense phase delivery line may feed the granular product to a secondary containment unit.

According to another aspect of the invention, the dense phase delivery line may include an inline secondary containment prior to the discharge outlet.

According to one aspect of the invention, the porous material is a screen.

According to yet another aspect of the invention, the granular product is at least one of seed and fertilizer.

The present invention also provides a method of making a dense phase delivery line comprising the following steps. A delivery line is provided having an inlet, an outlet, and at least one side wall running therebetween containing a passageway therein. A space formed in the at least one wall of the delivery line. A porous medium is placed in the space formed in the delivery line. At least one control cover is provided and configured to selectively cover the porous medium.

According to one aspect of the invention, configuring said control cover to selectively cover the porous medium includes attaching a containment cap to the delivery line over the porous medium and placing at least part of the control cover in the containment cap to define an adjustable volume between the porous medium, the containment cap, and an edge of the control cover.

According to another aspect of the invention, the porous medium is a screen.

These and still other advantages of the invention will be apparent from the detailed description and drawings. What follows is merely a description of the preferred embodiments of the present invention. To assess the full scope of the invention the claims should be looked to as the preferred embodiments are not intended to be the only embodiments within the scope of the claims.

BRIEF DESCRIPTION OF THE DRAWINGS

FIG. 2 is a side view of the dense phase delivery line having a section with a porous medium;

FIG. 3 is a cross-sectional side view of the dense phase delivery line of FIG. 2 with a control cover over the porous medium;

FIG. 3A is a cross-sectional view of the dense phase delivery lines along a line 3A-3A;

FIG. 4 is a cross-sectional side view of the dense phase delivery line of FIG. 2 with a control cover being removed from the porous medium;

FIG. 5 is another dense phase delivery line with a discharge outlet positioned over a secondary containment unit;

FIGS. 6A-C is a dense phase delivery line similar to FIG. 5 which further incorporates an air and product valve;

FIG. 7A is a side view of a dense phase delivery line incorporating a containment cap over the porous medium and having a control cover slideably moveable between the containment cap and the porous medium;

FIG. 7B is a top view of the dense phase delivery line of FIG. 7A;

FIG. 7C is a front view of the dense phase delivery line of FIG. 7A;

DETAILED DESCRIPTION OF THE PREFERRED EMBODIMENTS

The following applications, each having a filing date of Nov. 14, 2008, are hereby incorporated by reference as if fully set forth herein: U.S. application Ser. No. 12/271,618 ("Sectional Distribution of Granular Product"); U.S. application Ser. No. 12/271,679 ("Agricultural Implement with Dense Phase Product Flow from a Primary Container"); U.S. application Ser. No. 12/271,745 ("Agricultural Implement with Dense Phase Product Dispensing and Purging"); U.S. application Ser. No. 12/271,765 ("Valve and Method for Dense Phase Flow Control"); U.S. application Ser. No. 12/271,787 ("Dense Phase Distribution Branch"); U.S. application Ser. No. 12/271,808 ("Pressure Supply Assembly for an Agricultural Implement with Dense Phase Product Flow"); U.S. application Ser. No. 12/271,816 ("Dense Phase Induction System and Method"); U.S. application Ser. No. 12/271,822 ("Granular Containment Assembly and Method").

Figure 1:
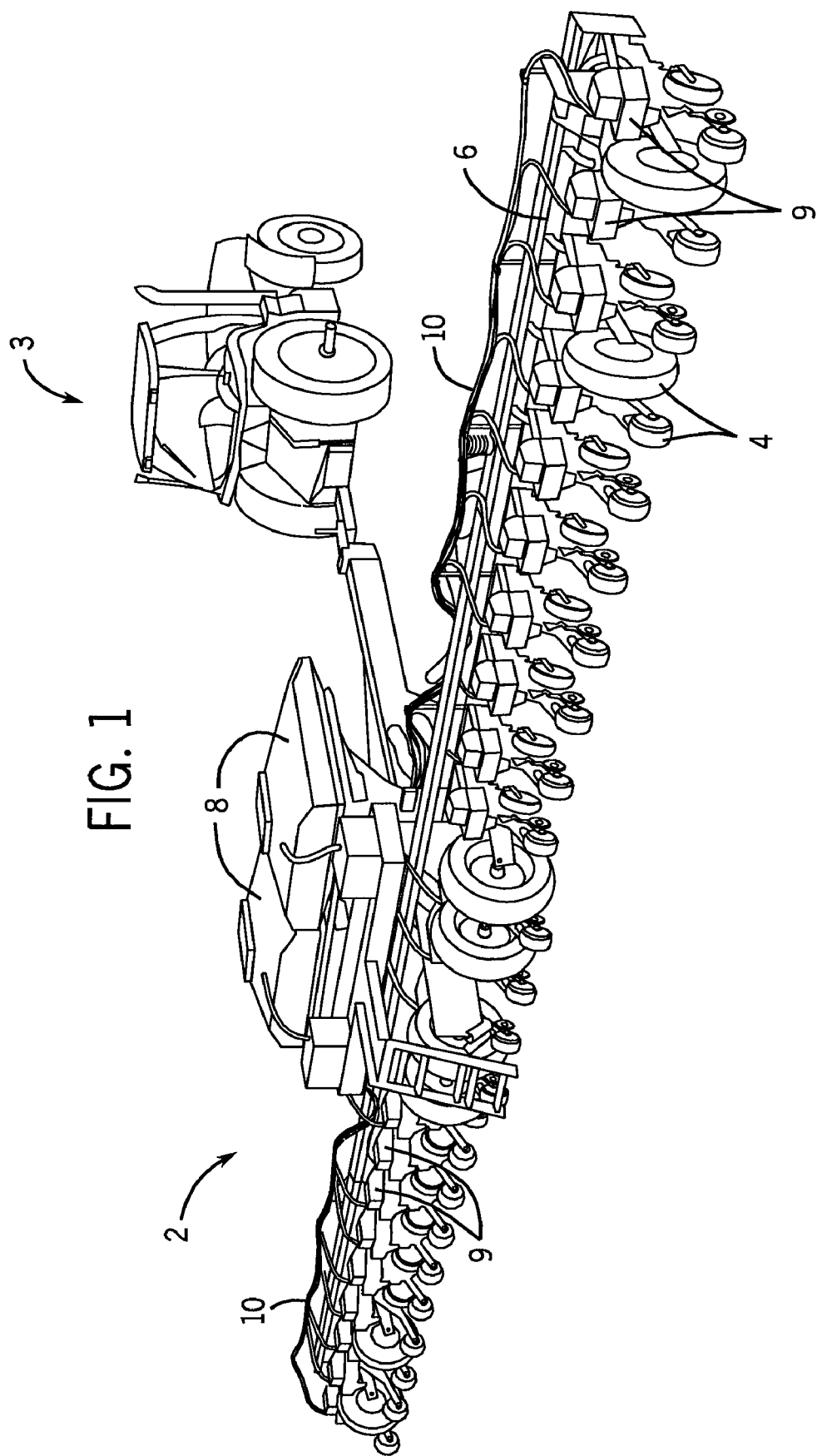
FIG. 1 is a perspective view of an agricultural implement incorporating the present invention.

Referring now to FIG. 1, an agricultural implement 2 is shown for the distribution of a granular product such as seed, fertilizer, and the like. The agricultural implement 2 may be pulled behind a tractor 3. Wheels 4 are mounted to a frame 6 to make pulling the agricultural implement 2 across the ground easier.

On the frame 6, the agricultural implement 2 has two primary containment units 8 for holding and dispensing the granular product and a plurality of sections 9 for the secondary containment of the granular product. The dense phase delivery lines 10 connect the primary containment units 8 to the sections 9. Generally, the agricultural implement 2 is designed such that the primary containment units 8 hold large amounts of the granular product which is to be distributed to each of the sections 9 for temporary containment, metering, and distribution during to seeding, fertilizing or the like by the dense phase delivery lines 10.

Referring now to FIG. 2, the dense phase delivery line 10 for the transport of a granular product, such as seed 12, is shown. Such a dense phase delivery line may be used in an agricultural implement such as a seeder, a planter, or the like. The granular product could be seed, fertilizer, and the like. Seed 12 is only used as one example. The dense phase delivery line 10 has a passageway 14 extending from an intake end 16 for receiving pressured air and seed to a discharge outlet 18. The dense phase delivery line 10 includes at least one side wall 20 that is, as shown, tubular. It is, however, contemplated that the hollow tube form may take various geometric shapes, such as circular, rectangular, triangular, and the like. Further, as shown in FIG. 2, a narrow portion 22 of the dense phase delivery line 10 proximate the intake end 16 may have a smaller diameter than a wider portion 24 of the dense phase delivery line 10 proximate the discharge outlet 18. The wider portion 24 of the dense phase delivery line 10 may be desirable as it can serve as a location for the secondary containment of seed 12 within the dense phase delivery line 10.

Upstream of the discharge outlet 18, there is a porous medium 26 that is located along a portion of the side wall 20. The porous medium 26 provides a fluid pathway between an inner volume of the passageway 14 of the dense phase delivery line 10 and a volume outside of the passageway 14. The porous medium 26 preferably has a pore size that is sufficiently small to prevent the passage of seed 12 through the porous medium 26 or to prevent the clogging of the porous medium 26 with seed 12 while having a pore size suitable for accommodating the fluid flow of air.

Additionally, the porous medium 26 is shown on an upper surface of the dense phase delivery line 10. By placing the porous medium 26 on the upper surface, the possibility that some of the pores will be plugged by the seed 12 (via gravity) is minimized. However, it is contemplated that the porous medium 26 could also be placed on the side or bottom of the dense phase delivery line 10.

In one preferred form, the porous medium 26 is a screen having a mesh size that is smaller than the granular product being transferred in the dense phase delivery line 10. However, it is also contemplated that the porous medium 26 could be a sintered material with the desired porosity or any other material having appropriately-sized pores for the granular product being transported.

Furthermore, although the porous medium 26 is shown as being proximate the discharge outlet 18, the porous medium 26 can be located anywhere along the dense phase delivery line 10. Preferably, however, the porous medium 26 is located proximate the discharge outlet 18. This is especially preferable with reference to the forms of the invention that use a sliding control cover to locally alter the velocity of air proximate the porous medium, as will be described in further detail below with reference to FIGS. 7-10.

If pressurized air and seed 12 are provided at the intake end 16 of the dense phase delivery line 10, then the seed 12 may begin to be pneumatically transported along the dense phase delivery line 10. The air and seed 12 will begin to flow from the intake end 16 towards the discharge outlet 18. However, when the air and seed 12 approach the porous medium 26 (in an uncovered position as in FIG. 2), a portion of the air flows through the porous medium 26 and a portion of the air flows through the remainder of the dense phase delivery line 10 and out the discharge outlet 18. As a result of a portion of the air flowing out of the porous medium 26, the velocity of the air in the dense phase delivery line 10 between the porous medium 26 and the discharge outlet 18 drops. This drop in pressure downstream of the porous medium 26 is large enough to prevent further forward transport of the seed 12 through the dense phase delivery line 10 past the porous medium 26.

Referring now to FIGS. 2-4, the dense phase delivery line 10 is shown having a control cover 28 that can be selectively positioned over the porous medium 26 to control the flow of pressurized air from the inner volume of the passageway 14 through the porous medium 26. The control cover 28 is formed to substantially match the surface profile of the porous medium 26 and/or the portion of the dense phase delivery line 10 around the porous medium 26.

When the control cover 28 is positioned over the porous medium 26 to limit the flow of air, as shown in FIGS. 3 and 3A, the dense phase transfer of seed 12 is permitted through the dense phase delivery line 10. When the control cover 28 is positioned over the porous medium 26, the control cover 28 may block or essentially stop the flow of air from the passageway 14 through the porous medium 26 and into the surrounding atmosphere. This forces all of the air, or at least a substantial portion thereof, to continue along the passageway 14 of the dense phase delivery line 10 between the porous medium 26 and the discharge outlet 18. This maintains sufficient air velocity to induce the transport of seed 12 along the dense phase delivery line 10 between the porous medium 26 and the discharge outlet 18 and then out of the discharge outlet 18.

When the control cover 28 is removed from its position covering the porous medium 26, as shown in FIG. 4, the dense phase transport of seed 12 is inhibited through the dense phase delivery line 10. When the control cover 28 is cleared of the porous medium 26, then a portion of the air flows through the porous medium 26. As described above, this reduces the amount of air flowing through the dense phase delivery line 10 between the porous medium 26 and the discharge outlet 18. The reduced amount of air flowing through this portion of the dense phase delivery line 10 provides insufficient force to transport the seed 12 in this portion of the dense phase delivery line 10. Hence, when the control cover 28 does not cover the porous medium 26, the dense phase transport of seed 12 is inhibited.

Notably, the start and stopping of the dense phase transport of the seed 12 may be achieved without any adjustments to an air compressor or other device located upstream to provide the air flow through the dense phase delivery line 10. Only the selective placement of the control cover 28 over the porous medium 26 is used to control the flow of air through the downstream end of the dense phase delivery line 10. By venting of some of the air through the porous medium 26, the flow of air through the downstream end is reduced without stopping an upstream flow of the pressurized air through the dense phase delivery line 10.

The starting and stopping of the dense phase transport of the seed is somewhat analogous to the slip-stick phenomena in friction. Only when a sufficient force is applied to the seed 12 is the seed 12 transported forward. Although some force is applied to the seed 12 downstream of the porous medium 26 when the control cover 28 is removed, this force is insufficient to initiate transport of the seed 12.

It should be appreciated that although the starting and stopping of the dense phase transport of seed 12 is described as started or stopped by covering or uncovering the outer surface of the porous medium, that intermediate or partial covering may be used to achieve the same effect. As used herein with reference to the porous medium 26, the term "outer surface" refers to the pseudo-surface or pseudo-surfaces of the porous medium 26 corresponding to the surfaces that would be created if the pores of the porous medium 26 were filled to create a solid body.

Generically, the control cover 28 can be moveable between a first position that permits dense phase transport of seed 12 and a second position that inhibits dense phase transport of seed 12. In the first position, the control cover 28 may cover the entirety of an outer surface the porous medium 26 or only a portion thereof. In the second position, the control cover 28 may be entirely removed from the outer surface of the porous medium 26 or only cover a portion thereof. However, in either case, more of the outer surface of the porous medium 26 will be covered in the first position than in the second position. Thus, in the first position, configurations are possible in which a portion of the air vents from the inner volume of the dense phase delivery line 10 via the porous medium 26, but that there will still be a sufficient flow of air through the downstream end of the dense phase delivery line 10 to provide sufficient force for dense phase transport of the seed 12.

Additionally, there may be intermediate positions between the first position and the second position that can be used to non-incrementally or incrementally adjust the flow of air through the downstream end of the dense phase delivery line 10. Thus, a partial movement between the first position and the second position may allow for the dense phase transfer of seed, albeit at a different rate than the first position.

It is contemplated that a controller could be used to move the control cover 28 between the first position and the second position. Such a controller could be used in conjunction with sensors for detecting various conditions (e.g., the forward movement of a seeder, how full a secondary containment unit is, and the like) and place the control cover 28 in the appropriate position.

Referring now to FIG. 5, a form of the dense phase delivery line 10 is shown in which the dense phase delivery line 10 has a down leg 30. The down leg 30 is downstream of the porous medium 26 and has the discharge outlet 18 directed at a secondary containment unit 32. In this form, when the control cover 28 is removed to reduce the flow of air through the portion of the dense phase delivery line 10 between the porous medium 26 and the discharge outlet 18, then the dense phase transport of seed 12 is inhibited and the seed 12 located in the down leg 30 may fall into the secondary containment unit 32 by the force of gravity. This clears at least a portion of the downstream end of the dense phase delivery line 10.

Referring now to FIGS. 6A-6C, the dense phase delivery line 10 having the down leg 30 is shown in conjunction with an air and product valve 34. The air and product valve 34 is placed downstream of the porous medium 26. The air and product valve 34 is moveable between an open position in which the air and product valve 34 is substantially clear of the portion of the passageway 14 between the porous medium 26 and the discharge outlet 18 and a closed position in which the air and product valve 34 blocks at least a portion of the passageway 14 between the porous medium 26 and the discharge outlet 18.

To avoid damaging the seed 12, the air and product valve 34 is preferably moveable into and out of a portion of the passageway 14 that is cleared of seed when the dense phase transport stops, such as the down leg 30. An example of this can be seen in FIGS. 6A-6C. In FIG. 6A, the control cover 28 covers the porous medium 26 to permit the dense phase transport of seed along the down leg 30. When the control cover 28 is removed, as shown in FIG. 6B, then the dense phase transport is inhibited and gravity clears the seed 12 from the down leg 30. Next, the air and product valve 34 can be moved into a portion of the dense phase delivery line 10 that is cleared of seed 12 to mechanically block the passageway 14. As shown in FIG. 6C, the air and product valve 34 is moved into the transition between the horizontal portion of the dense phase delivery line 10 and the down leg 30.

Although not shown, it should be appreciated that when the valve is closed, the air pressure will equilibrate along the length of the dense phase delivery line 10. Upon reopening of the valve 34, there will be a tendency for the sudden pressure differential to cause a surge of seed 12 from the discharge outlet 18. This surge may be reduced in two ways. First, the control cover 28 can be lifted from the porous medium 26 for a period of time to bleed the air from the line prior to opening the valve 34. Second, there may be another porous section in the dense phase delivery line 10 proximate that valve 34 that is exposed as the valve 34 is open. Thus, as the valve 34 opens, the valve 34 simultaneously opens a porous section that bleeds air from the dense phase delivery line 10 reducing the effect of the initial surge.

The air and product valve 34 may be operated in a number of ways and may be linked to a controller. The air and product valve 34 may be pneumatically- or electrically-operated. The controller may be programmed to provide a sufficient delay between the starting and stopping of the dense phase transport and the movement of the air and product valve 34 to ensure that there is sufficient time for gravity to clear the seed 12 from the down leg 30 before the air and product valve 34 is closed. Likewise, the controller may be used to bleed air from the dense phase delivery line 10 by uncovering the porous medium 26 before opening the valve to avoid a sudden surge of seed 12.

The presence of an air and product valve 34 may be used to prevent the unwanted transport of the stopped seed out of the discharge outlet 18 when the dense phase transport is stopped. As the dense phase delivery line 10 may be incorporated in a seeder or other moving implement, vibrations from other operations (e.g. movement of the seeder) may agitate the stopped seed resulting in unwanted discharge of the seed 12 from the discharge outlet 18. The use of the air and product valve 34 can eliminate such unwanted discharge.

Referring now to FIGS. 7A-7C, another form of the dense phase delivery line 10 is shown in which a containment cap 36 is affixed above the porous medium 26. The containment cap 36 is rigidly connected to an outer surface of the side wall 20 of the dense phase delivery line 10 proximate the porous medium 26. The rigid connection could be formed in a number of ways including fastening, welding, and other common forms of attachment.

The containment cap 36 is attached such that a space 38 exists between the containment cap 36 and porous medium 26. The control cover 28 may be received in the space 38 and slideably moved to selectively cover the outer surface of the porous medium 26. As the control cover 28 is slideably moved within the space 38, an adjustable volume 40 is defined between an inner surface 42 of the containment cap 36, an outer surface 44 of the porous medium 26, and an edge 46 of the control cover 28. The movement of the control cover 28 within the space 38 can be used to change the adjustable volume 40.

Although in this form no air is vented from the porous medium 26 into the surrounding atmosphere, the change in the adjustable volume 40 can be used to start and stop the dense phase transport of seed 12. When the control cover 28 is moved such as to enlarge the adjustable volume 40, the cross-sectional area of the dense phase delivery line 10 locally increases. This localized increase in the cross-sectional area can be used to reduce the pressure on the seed 12, and stop the flow of seed 12 under the porous medium 26 as a portion of the air flows through the porous medium 26 and adjustable volume 40.

Figure 8:
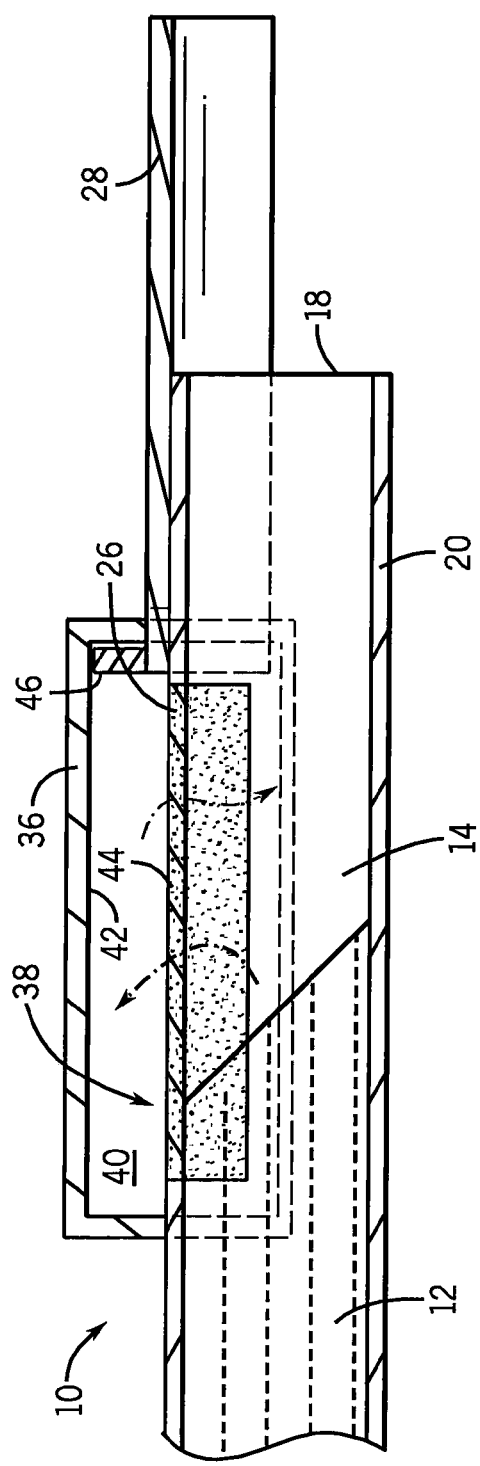
FIG. 8 is a detailed cross-sectional side view of the dense phase delivery line of FIGS. 7A-7C with the control cover in a position that substantially uncovers the porous medium.
Figure 9:
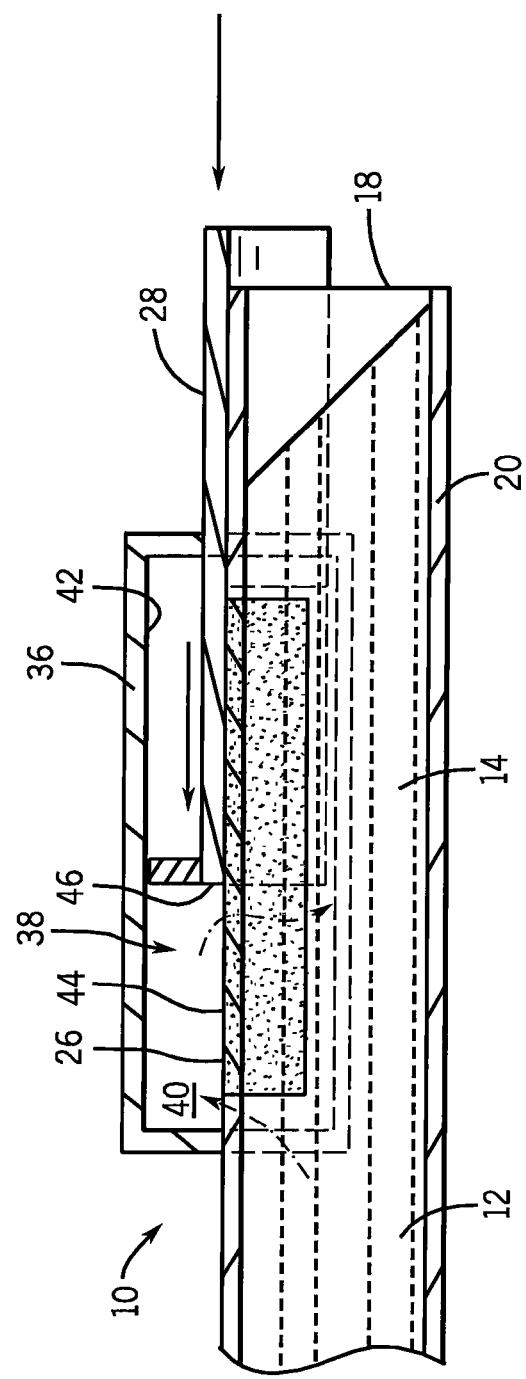
FIG. 9 is a detailed cross-sectional side view of the dense phase delivery line of FIGS. 7A-7C with the control cover in a position that covers a portion of the porous medium.
Figure 10:
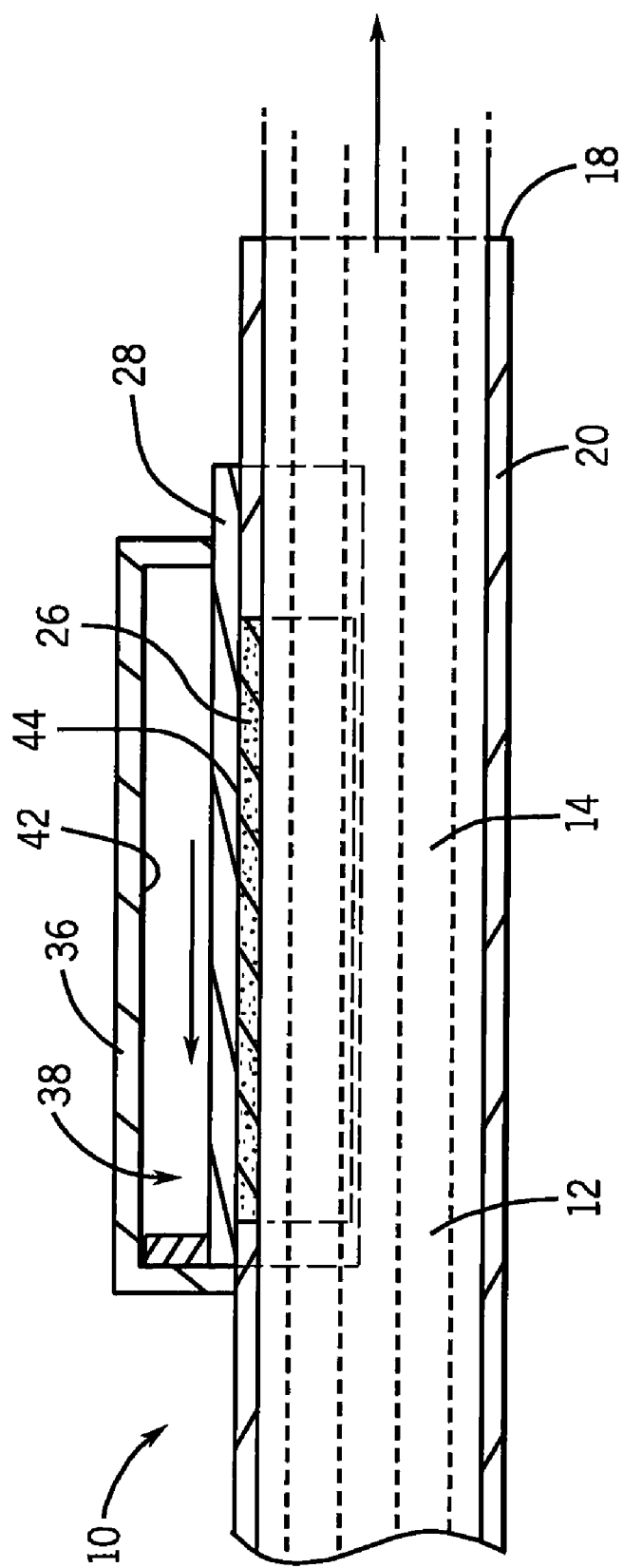
FIG. 10 is a detailed cross-sectional side view of the dense phase delivery line of FIGS. 7A-7C with the control cover in a position that substantially covers the porous medium.

FIGS. 8-10 show some of the positions that the control cover 28 may have. In FIG. 8, the control cover 28 is position such as to increase the size of the adjustable volume 40 and inhibit the flow of seed 12. In FIG. 9, the control cover 28 is shown part way into the space 38. In this position, it is contemplated that the air flow may be partially restricted to slow, but not completely stop, the dense phase transport of seed 12. In FIG. 10, the control cover 28 is slid all the way in to minimize the adjustable volume 40 and to maximize the flow rate of pressurized air through the portion of the dense phase delivery line 10 proximate the porous medium 26.

Thus, the present invention provides a dense phase delivery line and method of controlling dense phase transport of a granular product such a seed. The present invention provides a way to start, stop, and otherwise control dense phase transport without complex pneumatics or inline values that will crush the granular product being transported.

Many modifications and variations to these preferred embodiments will be apparent to those skilled in the art, which will be within the spirit and scope of the invention. Therefore, the invention should not be limited to the described embodiments. To ascertain the full scope of the invention, the following claims should be referenced.

INDUSTRIAL APPLICABILITY

The invention provides a dense phase delivery line for the dense phase transport of a granular material, such as seed.

What is claimed is:

1. An agricultural implement comprising:

a pair of primary containment unit mounted to a frame for holding and dispensing a granular product;

a plurality of sections for secondary containment of said granular product;

a device for controlling a dense phase transport of a granular product through a dense phase delivery line including at least one side wall defining a passageway that extends from an intake end connected to said primary containment unit for receiving pressurized air and the granular product to a discharge outlet connected to said plurality of sections for secondary containment of said granular product, the device comprising:

a porous medium located along a portion of the at least one side wall of the dense phase delivery line upstream of the discharge outlet, the porous medium providing a fluid pathway between an inner volume of the passageway of the dense phase delivery line and a volume outside of the dense phase delivery line; and a control cover moveably positionable proximate the porous medium for selectively controlling a flow of the pressurized air from the inner volume of the passageway through the porous medium;

wherein, when pressurized air and the granular product are provided on the intake end of the dense phase delivery line, the control cover can be moved from a first position that permits the dense phase transport of the granular product through the dense phase delivery line and out the discharge outlet to a second position that inhibits the dense phase transport of the granular product through the dense phase delivery line without stopping an upstream flow of the pressurized air.

2. The device of claim 1, wherein, when the control cover is in the first position that permits a dense phase transport of the granular product through the dense phase delivery line and out the discharge outlet, the control cover entirely covers an outer surface of the porous medium to essentially stop the flow of the pressurized air from the passageway through the porous medium.

3. The device of claim 1, wherein, when the control cover is in the first position that permits a dense phase transport of the granular product through the dense phase delivery line and out the discharge outlet, the control cover covers only a portion of the porous medium to allow a portion of the pressurized air in the passageway through the porous medium.

4. The device of claim 1, wherein, when the control cover is in the second position that inhibits the dense phase transport of the granular product through the dense phase delivery line, the control cover is entirely removed from an outer surface of the porous medium to allow the flow of a portion of the pressurized air from the passageway through the porous medium.

5. The device of claim 1, wherein, when the control cover is in the second position that inhibits the dense phase transport of the granular product through the dense phase delivery line, the control cover covers only a portion of the porous medium to allow a portion of the pressurized air in the passageway through the porous medium.

6. The device of claim 1, wherein the porous medium has a pore size less than the granular product being transported by the dense phase delivery line during dense phase flow for permitting a portion of the pressurized air through the porous medium while preventing the passage of the granular product through the porous medium.

7. The device of claim 1, further comprising a controller that moves the control cover between one of the first position and the second position to the other of the first position and the second position.

8. The device of claim 1, further comprising an air and product valve along the dense phase delivery line downstream of the porous medium that selectively blocks the dense phase delivery line upstream of the discharge outlet.

9. The device of claim 8, wherein the dense phase delivery line further includes a down leg downstream of the porous medium and before the air and product valve, such that a portion of the granular product travels down the down leg to the discharge outlet before the air and product valve is closed to clear the air and product valve of the granular product.

10. The device of claim 1, further comprising a containment cap rigidly connected to an outer surface of the at least one side wall of the dense phase delivery line proximate the porous medium, the containment cap having a space between the containment cap and the porous medium for slideably receiving the control cover.

11. The device of claim 10, wherein the containment cap is welded to the outer surface of the at least one side wall of the dense phase delivery line.

12. The device of claim 10, wherein an inner surface of the containment cap, an outer surface of the porous medium, and an edge of the control cover define an adjustable volume between the containment cap, the porous medium, and the control cover.

13. The device of claim 12, wherein the control cover is slideably moveable within the space between the control cover and the porous medium to change the adjustable volume and control the dense phase flow of the granular product.

14. The device of claim 1, wherein the discharge outlet of the dense phase delivery line feeds the granular product to a secondary containment unit.

15. The device of claim 1, wherein the dense phase delivery line includes an inline secondary containment prior to the discharge outlet.

16. The device of claim 1, wherein the porous material is a screen.

17. The device of claim 1, wherein the granular product is at least one of seed and fertilizer.

* * * * *